United States Patent
Bai et al.

(10) Patent No.: US 10,813,157 B1
(45) Date of Patent: Oct. 20, 2020

(54) BEAM FAILURE RECOVERY AND RELATED TIMING DETERMINATION TECHNIQUES

(71) Applicant: QUALCOMM Incorporated, San Diego, CA (US)

(72) Inventors: Tianyang Bai, Bridgewater, NJ (US); Yan Zhou, San Diego, CA (US); Kiran Venugopal, Raritan, NJ (US); Jung Ho Ryu, Fort Lee, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/805,406

(22) Filed: Feb. 28, 2020

Related U.S. Application Data

(60) Provisional application No. 62/910,642, filed on Oct. 4, 2019, provisional application No. 62/926,233, filed on Oct. 25, 2019.

(51) Int. Cl.
| | |
|---|---|
| *H04W 76/19* | (2018.01) |
| *H04W 16/28* | (2009.01) |
| *H04W 76/15* | (2018.01) |
| *H04W 72/12* | (2009.01) |

(52) U.S. Cl.
CPC .......... *H04W 76/19* (2018.02); *H04W 16/28* (2013.01); *H04W 72/1268* (2013.01); *H04W 72/1284* (2013.01); *H04W 72/1289* (2013.01); *H04W 76/15* (2018.02)

(58) Field of Classification Search
CPC ............. H04W 16/28; H04W 72/1268; H04W 72/1284; H04W 72/1289; H04W 76/15; H04W 76/19
See application file for complete search history.

(56) References Cited

U.S. PATENT DOCUMENTS

| | | | |
|---|---|---|---|
| 2019/0260458 A1* | 8/2019 | Zhou | H04B 7/0877 |
| 2019/0289588 A1* | 9/2019 | Akkarakaran | H04B 7/088 |
| 2019/0306924 A1* | 10/2019 | Zhang | H04W 88/06 |
| 2020/0107331 A1* | 4/2020 | Tsai | H04W 72/0413 |

\* cited by examiner

*Primary Examiner* — Brian P Cox
(74) *Attorney, Agent, or Firm* — Qualcomm IP Dept.; James Hunt Yancey, Jr.

(57) ABSTRACT

Aspects of the present disclosure provide techniques for beam failure detection and related timing determinations, such as for applying a default beam after beam failure recovery response (BFRR) message. A method by a user equipment (UE) may include detecting failure of a beam associated with a first cell. The detecting can include performing beam failure detection (BFD) of a beam pair link (BPL) associated with the first cell (e.g., secondary cell (Scell)). The first cell can be in carrier aggregation (CA) with a second cell. The UE may send a beam failure recovery request (BFRQ) message on a second cell (e.g., a primary cell (Pcell)). The BFRQ message can include a candidate recovery beam for the first cell. The UE can receive a BFRR message on the second cell and determine a duration from reception of the BFRR message until using a default beam for communications on the first cell.

23 Claims, 10 Drawing Sheets

BEAM FAILURE RECOVERY AND RELATED TIMING DETERMINATION TECHNIQUES

PRIORITY CLAIMS

This application claims priority to and the benefit of U.S. Provisional Application Nos. 62/926,233, filed Oct. 25, 2019, and 62/910,642, filed Oct. 4, 2019, both of which are expressly incorporated by reference in their entirety as if fully set forth below and for all applicable purposes.

TECHNICAL FIELD

Aspects of the present disclosure relate generally to wireless communications, and more particularly, to techniques for beam failure recovery. Some embodiments may utilize a default beam selection during beam failure scenarios to help enable and provide improved latency and processing timelines (e.g. those associated with beam recovery operations and cell transitions during communication operations).

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY OF SOME EXAMPLES

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include a duration until applying a default beam after receiving a beam failure recover response (BFRR) message that can be used for beam recovery procedures even in carrier aggregation (CA) operation.

Some aspects of the subject matter described in this disclosure can be implemented in a method for wireless communication by a user equipment (UE). The method generally includes detecting failure of a beam associated with a first cell. For example, the method may include performing beam failure detection (BFD) of a beam pair link (BPL). The BPL can be associated with a first cell. The first cell can be in CA with a second cell. The method generally includes sending a beam failure recovery request (BFRQ) message on a second cell. The BFRQ message can include an indication of a candidate recovery beam for the first cell. The method generally includes receiving a BFRR message on the second cell. The method generally includes determining a duration starting from reception of the BFRR message until using a default beam for communications. The default beam can be used for communication on the first cell associated with the failed BPL. The method generally includes communicating on the first cell using the default beam after the duration from receiving the BFRR.

Some aspects of the subject matter described in this disclosure can be implemented in a method for wireless communication by a base station (BS). The method generally includes determining a duration starting from sending of a BFRR message until using a default beam for communications. The default beam can be used for communications with a UE on a first cell. The method generally includes communicating using the default beam after the determined duration. The default beam can be used for communicating with the UE on the first cell after the determined duration.

Some aspects of the subject matter described in this disclosure can be implemented in an apparatus for wireless communication. The apparatus generally includes at least one processor coupled with a memory. The memory stores code executable by the at least one processor to cause the apparatus to detect failure of a beam associated with a first cell. The detection can include performing BFD of a BPL. The BPL can be associated with a first cell. The first cell can be in CA with a second cell. The memory stores code executable by the at least one processor to cause the apparatus to send a BFRQ message on a second cell. The BFRQ message can include an indication of a candidate recovery beam for the first cell. The memory stores code executable by the at least one processor to cause the apparatus to receive a BFRR message on the second cell. The memory stores code executable by the at least one processor to cause the apparatus to determine a duration starting from reception of the BFRR message until using a default beam for communications. The default beam can be used for communication on the first cell associated with the failed BPL. The memory stores code executable by the at least one processor to cause the apparatus to communicate on the first cell using the default beam after the duration from receiving the BFRR.

Some aspects of the subject matter described in this disclosure can be implemented in an apparatus for wireless communication. The apparatus generally includes at least one processor coupled with a memory. The memory stores code executable by the at least one processor to cause the apparatus to determine a duration starting from sending of a BFRR message until using a default beam for communications. The default beam can be used for communications with a UE on a first cell. The memory stores code executable by the at least one processor to cause the apparatus to communicate using the default beam after the determined duration. The default beam can be used for communicating with the UE on the Scell after the determined duration.

Some aspects of the subject matter described in this disclosure can be implemented in an apparatus for wireless communication. The apparatus generally includes means for detecting failure of a beam associated with a first cell. The detecting can performing BFD of a BPL. The BPL can be associated with a first cell. The first cell can be in CA with a second cell. The apparatus generally includes means for sending a BFRQ message on a second cell. The BFRQ message can include an indication of a candidate recovery beam for the Scell. The apparatus generally includes means for receiving a BFRR message on the second cell. The apparatus generally includes means for determining a duration starting from reception of the BFRR message until using a default beam for communications. The default beam can be used for communication on the first cell associated with the failed BPL. The apparatus generally includes means for communicating on the first cell using the default beam after the duration from receiving the BFRR.

Some aspects of the subject matter described in this disclosure can be implemented in an apparatus for wireless communication. The apparatus generally includes means for determining a duration starting from sending of a BFRR message until using a default beam for communications. The default beam can be used for communications with a UE on a first cell. The apparatus generally includes means for communicating using the default beam after the determined duration. The default beam can be used for communicating with the UE on the first cell after the determined duration.

Some aspects of the subject matter described in this disclosure can be implemented in a computer readable medium storing computer executable code thereon for wireless communication. The computer readable medium generally stores code detecting failure of a beam associated with a first cell. The detecting can include performing BFD of a BPL. The BPL can be associated with a first cell. The first cell can be in CA with a second cell. The computer readable medium generally stores code for sending a BFRQ message on a second cell. The BFRQ message can include an indication of a candidate recovery beam for the first cell. The computer readable medium generally stores code for receiving a BFRR message on the second cell. The computer readable medium generally stores code for determining a duration starting from reception of the BFRR message until using a default beam for communications. The default beam can be used for communication on the first cell associated with the failed BPL. The computer readable medium stores code for communicating on the first cell using the default beam after the duration from receiving the BFRR.

Some aspects of the subject matter described in this disclosure can be implemented in a computer readable medium storing computer executable code thereon for wireless communication. The computer readable medium generally stores code for determining a duration starting from sending of a BFRR message until using a default beam for communications. The default beam can be used for communications with a UE on a first cell. The computer readable medium generally stores code for communicating using the default beam after the determined duration. The default beam can be used for communicating with the UE on the first cell after the determined duration.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
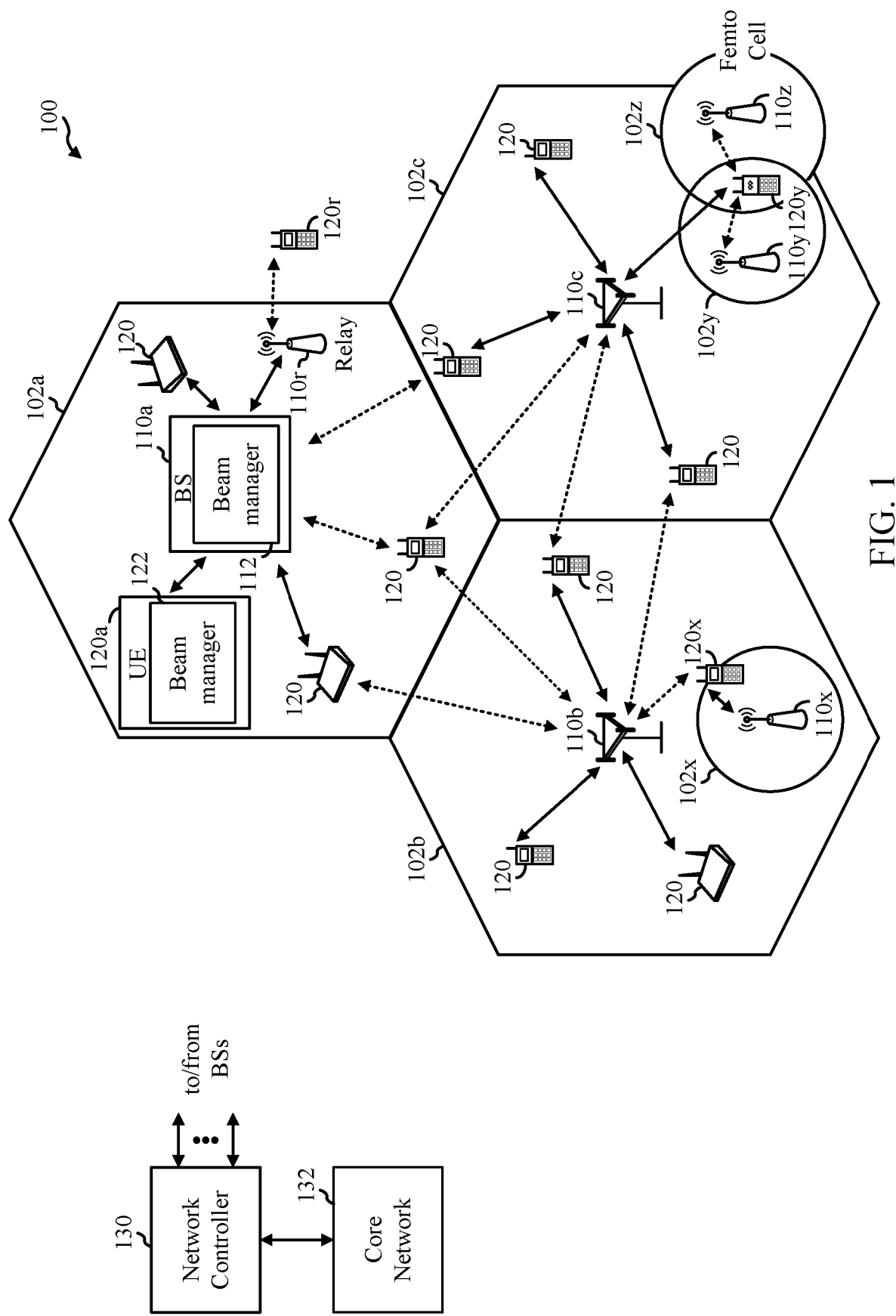
FIG. 1 is a block diagram conceptually illustrating an example wireless communication network, in accordance with certain aspects of the present disclosure.

Aspects of the present disclosure provide apparatus, methods, processing systems, and computer readable mediums for beam failure detection and related timing determination techniques. Aspects may include techniques for determining when to apply a default beam after a beam failure recovery response (BFRR) message. In some examples, the default beam is based on a default transmission configuration indicator (TCI) state.

In certain systems, after beam failure is detected and a beam failure recovery (BFR) procedure is started, a default beam may be used, for example, until a new beam is configured. It may take some message processing time and latency involved in switching beams, for example, to switch to the default beam. Timing determinations may be used to align timing relationships for communication between a UE and a BS and/or to align on one or more beams for use in cell transitions during operations According to certain aspects, a user equipment (UE) and a base station (BS) can determine a duration before applying, and/or expecting, use of the default beam. In some examples, the duration is a fixed duration. In some examples, the duration can be computed. In some examples, the duration is based on a subcarrier spacing (SCS) in a failed secondary cell (Scell) and the SCS in the primary cell (Pcell). Aspects also provide channels for which the default beam may be used. The duration may account for the processing time/latency for the UE and/or the BS to switch to the new beam, as well as accounting for the duration based on the numerologies of the Pcell and Scell.

The following description provides examples of channels for applying and a duration until applying a default beam after a BFRR message in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems, including later wireless technologies.

NR access may support various wireless communication services, such as enhanced mobile broadband (eMBB) targeting wide bandwidth (e.g., 80 MHz or beyond), millimeter wave (mmW) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

A network controller 130 may couple to a set of BSs 110 and provide coordination and control for these BSs 110. The network controller 130 may communicate with the BSs 110 via a backhaul.

The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for applying a default recover beam after a BFRR message. As shown in FIG. 1, the BS 110a includes a default recovery beam manager 112. The default recovery beam manager 112 may be configured to perform a BFD and BFR procedure with the UE 120a and to determine a duration after sending a BFRR message to the UE 120a until using a default recovery beam for communicating with the UE 120a, in accordance with aspects of the present disclosure. As shown in FIG. 1, the UE 120a includes a default recovery beam manager 122. The default recovery beam manager 122 may be configured to perform a BFD and BFR procedure with the BS 110a and to determine a duration after reception of a BFRR message from the BS 110a until using a default recovery beam for communicating with the BS 110a, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

Figure 2:
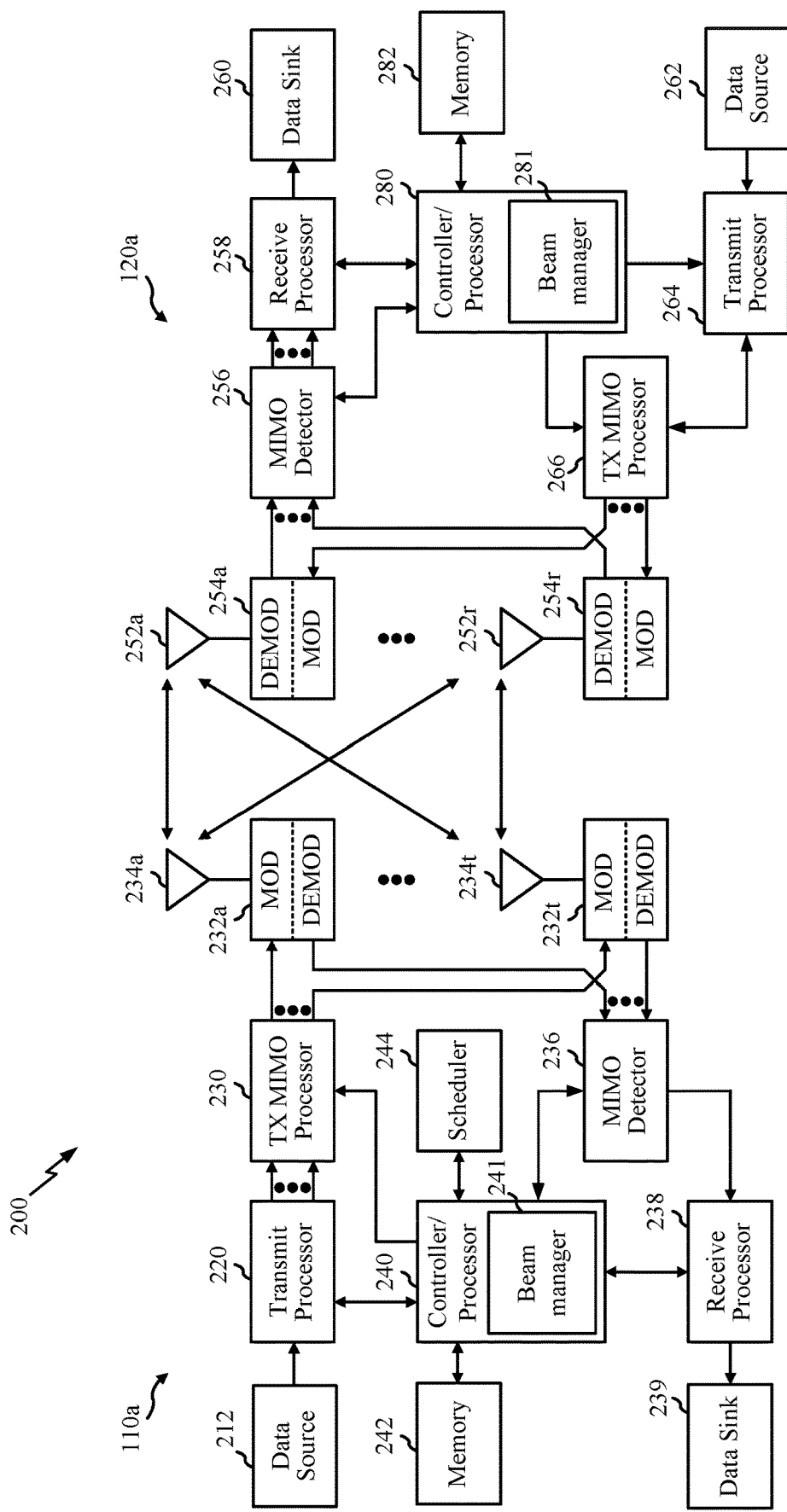
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, a base station may transmit a MAC CE to a user-equipment (UE) to put the UE into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel. A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has a default recovery beam manager 241 that may be configured for applying a default recovery beam after a BFRR, according to aspects described herein. As shown in FIG. 2, the controller/processor 280 of the UE 120a has a default recovery beam manager 241 that may be configured for applying a default recovery beam after a BFRR, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the downlink and/or uplink and single-carrier frequency division multiplexing (SC-FDM) on the uplink and/or downlink. NR may support half-duplex operation using time division duplexing (TDD). OFDM and SC-FDM partition the system bandwidth into multiple orthogonal subcarriers, also referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands.

The NR resource block (RB) may be 12 consecutive frequency subcarriers. NR may support a base subcarrier spacing (SCS) of 15 KHz and other SCS may be defined with respect to the base SCS, for example, 30 kHz, 60 kHz, 120 kHz, 240 kHz, etc. The symbol and slot lengths scale with the SCS. The CP length also depends on the SCS. 5G NR may also support beamforming and beam direction may be dynamically configured. Multiple-input multiple-output (MIMO) transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

Figure 3:
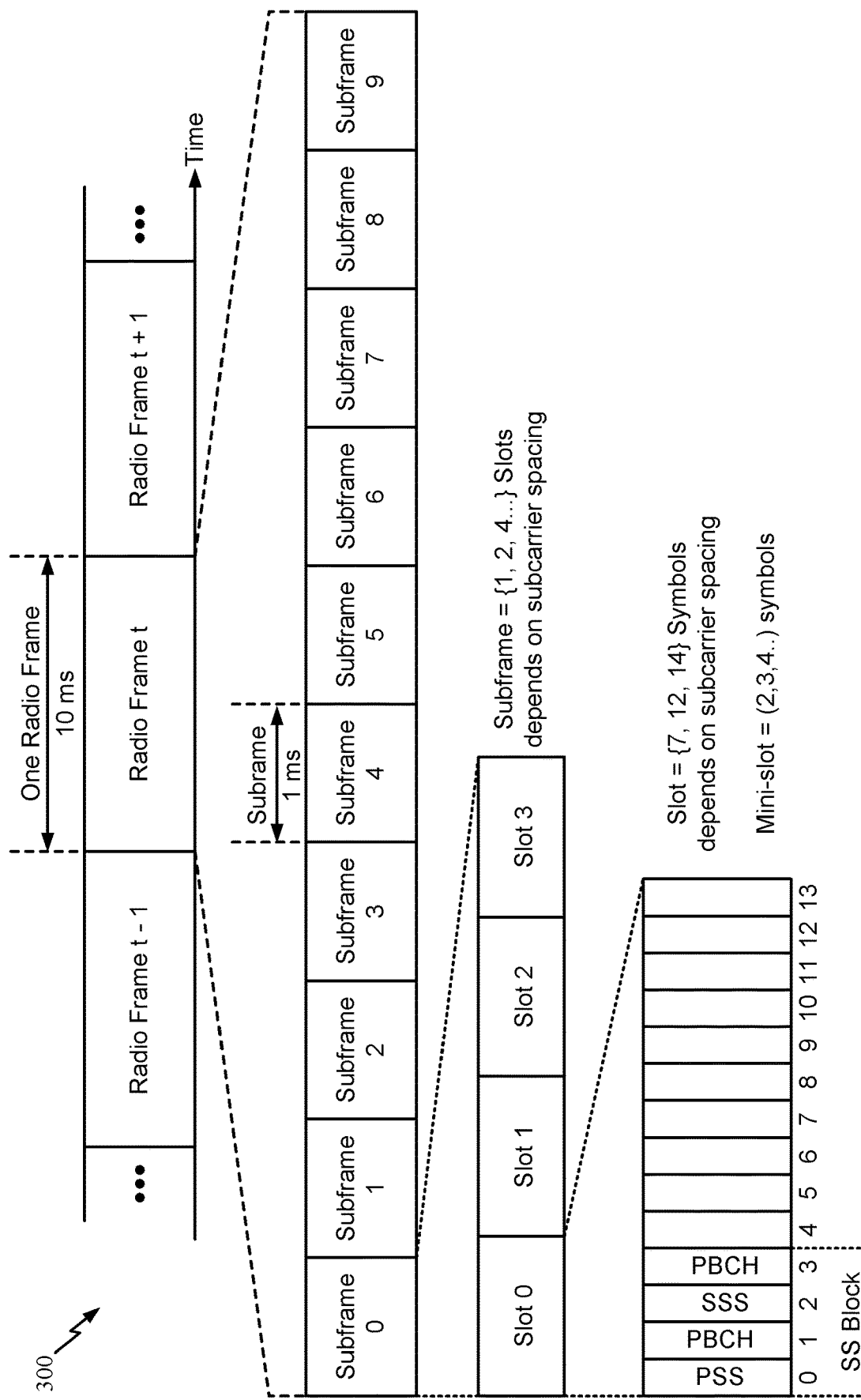
FIG. 3 illustrates an example of a frame format for a certain wireless communication systems, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Certain systems, such as NR, support carrier aggregation (CA). With CA, the UE can use multiple carriers/cells to communicate with a BS (or multiple BSs). CA involves a primary cell (Pcell) and at least one secondary cell (Scell). An Scell may be configured for downlink only, or configured for both uplink and downlink. The Pcell and Scell(s) can be in different frequency bands, such as a Pcell in one frequency range (e.g., FR1, sub-6 GHz) and the Scell in another frequency range (FR2, 28 GHz). The Pcell and Scell may use different numerologies (e.g., different tone spacing or SC S), leading to different symbol lengths for the Pcell and Scell(s). For example, in the FR1 the symbols length for a 120 KHz SCS is eight times shorter than a symbol length for a 15 kHz SCS in FR1.

As mentioned above, aspects of the present disclosure relate generally to beam failure detection and recovery. In some systems, narrow-beam transmission and reception is useful for improving the link budget at millimeter-wave (mmW) frequencies but may be susceptible to beam failure. In mmW, directional beamforming is used between the UE and a BS, and the UE and BS communicate via a beam pair link (BPL). A beam failure generally refers to a scenario in which the quality of a beam falls below a threshold, which may lead to radio link failure (RLF). NR supports a lower layer signaling to recover from beam failure, referred to as beam recovery. For example, instead of initiating a cell reselection when a beam quality becomes too low, a beam pair reselection within the cell may be performed.

Figure 4:
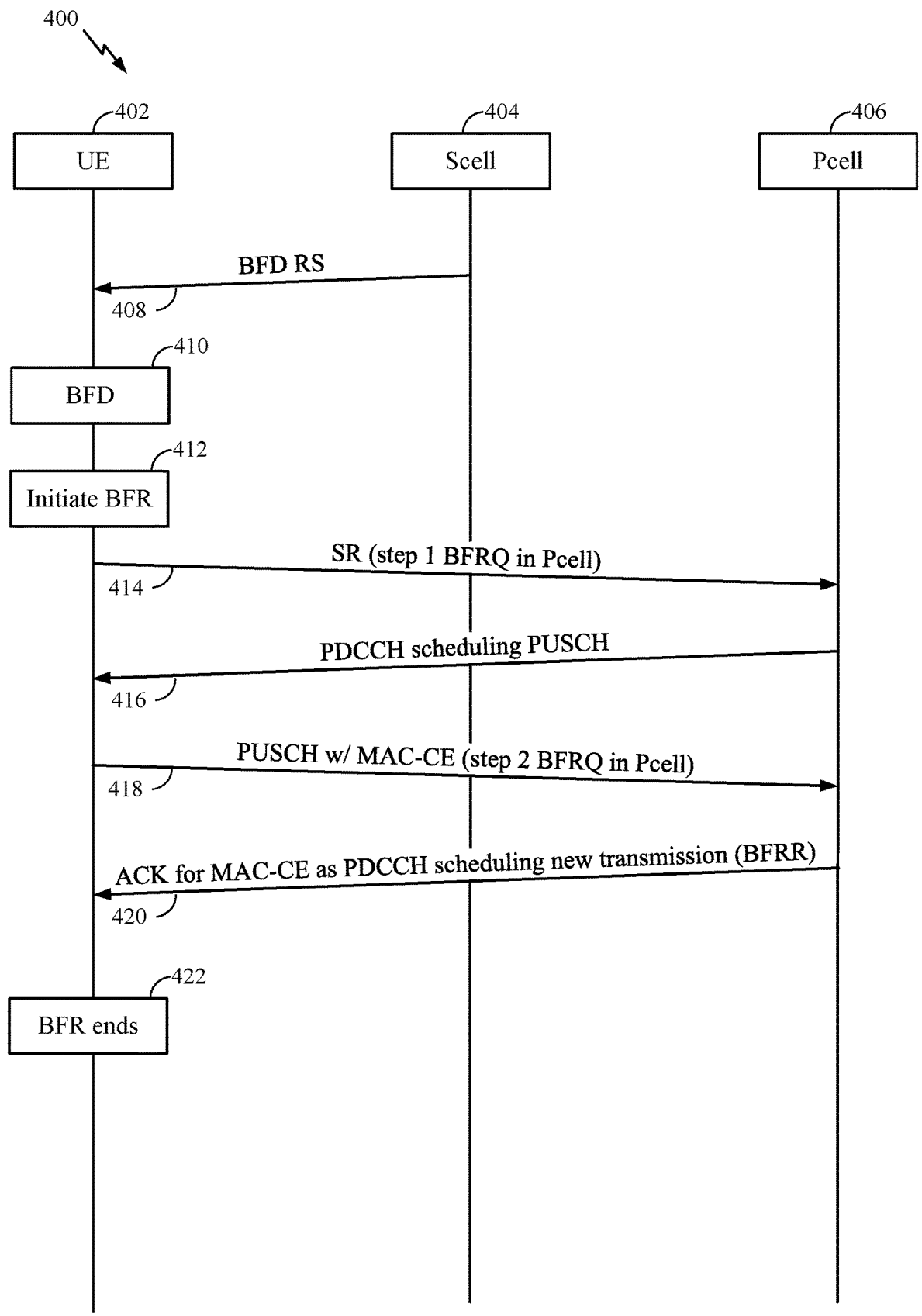
FIG. 4 is a call flow illustrating an example beam failure detection (BFD) and beam failure recovery (BFR) procedure, in accordance with certain aspects of the present disclosure.

FIG. 4 is a call flow 400 example BFD and BFR procedure, in accordance with certain aspects of the present disclosure. Beam failure may be detected by monitoring a beam failure detection (BFD) reference signal (RS) and assessing if a beam failure trigger condition has been met. As shown in FIG. 4, the UE 402 monitors, at 408, the BFD RS from the Scell 404. In some examples, beam failure detection is triggered if an estimated block error rate (BLER) of reference signals associated with a configured control resource set (CORESET) is above a threshold (e.g., 10%). In some examples, the UE 402 detects beam failure when the reference signal receive power (RSRP) or other signal quality measurement (based on the BFD RS) of a BPL fails to satisfy (e.g., is below) a threshold. Once BFD is detected (at 410), the UE 402 initiates beam failure recovery, at 412.

To recover the Scell 404, the UE 402 can send a beam failure request (BFRQ) message on another cell. The BFRQ may request a new transmission. In some examples, the BFRQ is sent on the Pcell 406, as shown in FIG. 4. In NR systems, a two-step BFRQ may be used. As shown in FIG. 4, after detecting beam failure, the UE 402 sends the first step (or first stage) of the BFRQ at 414. The first step of the BFRQ message may include a scheduling request (SR) on the Pcell 406. The SR may be sent on dedicated SR resources. The SR may request scheduling for the second step (or second stage) of the BFRQ message. As shown in FIG. 4, at 416, the UE 402 may receive a PDCCH from the Pcell 406, in response to the SR. The PDCCH schedules the second step of the BFRQ message. The UE 402 then sends the scheduled second step of the BFRQ message at 418 on the Pcell 406. For example, the UE 402 may send a PUSCH including a MAC-CE, as shown in FIG. 4. The MAC-CE may include an index of the failed CC (e.g., the Scell) and an indication of a new recovery beam candidate beam. In some examples, to find candidate new beams, the UE may monitor a beam identification reference signal.

At 420, the Pcell 406 responds to the BFRQ by transmitting a beam failure recovery response (BFRR) message to the UE 402, as shown in FIG. 4. The BFRR message may acknowledge the MAC-CE and include an uplink grant scheduling a new transmission. For example, the uplink grant may be a PDCCH with a grant scheduling a transmission for the same HARQ process as the PUSCH carrying the MAC-CE in the step two of the BFRQ. In some examples, the BFRR is sent over a CORESET (e.g., referred to as a CORESET-BFR) the UE 402 monitors for the response.

If the BFRR is received successfully, the beam recovery is completed, at 422, and a new BPL may be established. If the UE 402 cannot detect any response within a specific time period, the UE 402 may perform a retransmission of the request (e.g., the BFRQ by repeating the steps 414-418)). If the UE 302 cannot detect any response after a specified number of retransmissions, then the UE 302 may notify higher layers, potentially leading to RLF and cell reselection.

After successfully receiving the BFRR, at 420, and before the new BPL is established, the UE 402 may communicate on the Scell 404 using a default beam.

Techniques and apparatus for the UE and BS (associated with the Scell) to determine when to apply the default beam are desirable.

Aspects of the present disclosure provide techniques and apparatus for applying a default beam after a beam failure recovery response (BFRR) message. As mentioned above, after a BFRR message is sent/received, the beam failure recovery (BFR) procedure ends and a new beam pair link (BPL) may be configured for communicating on the failed cell (e.g., the secondary cell (Scell). Establishing the new BPL may include activating or reconfiguring a transmission configuration indicator (TCI) state beam for the failed cell after the BFR procedure is completed (e.g., after transmission of the BFRR).

Figure 5:
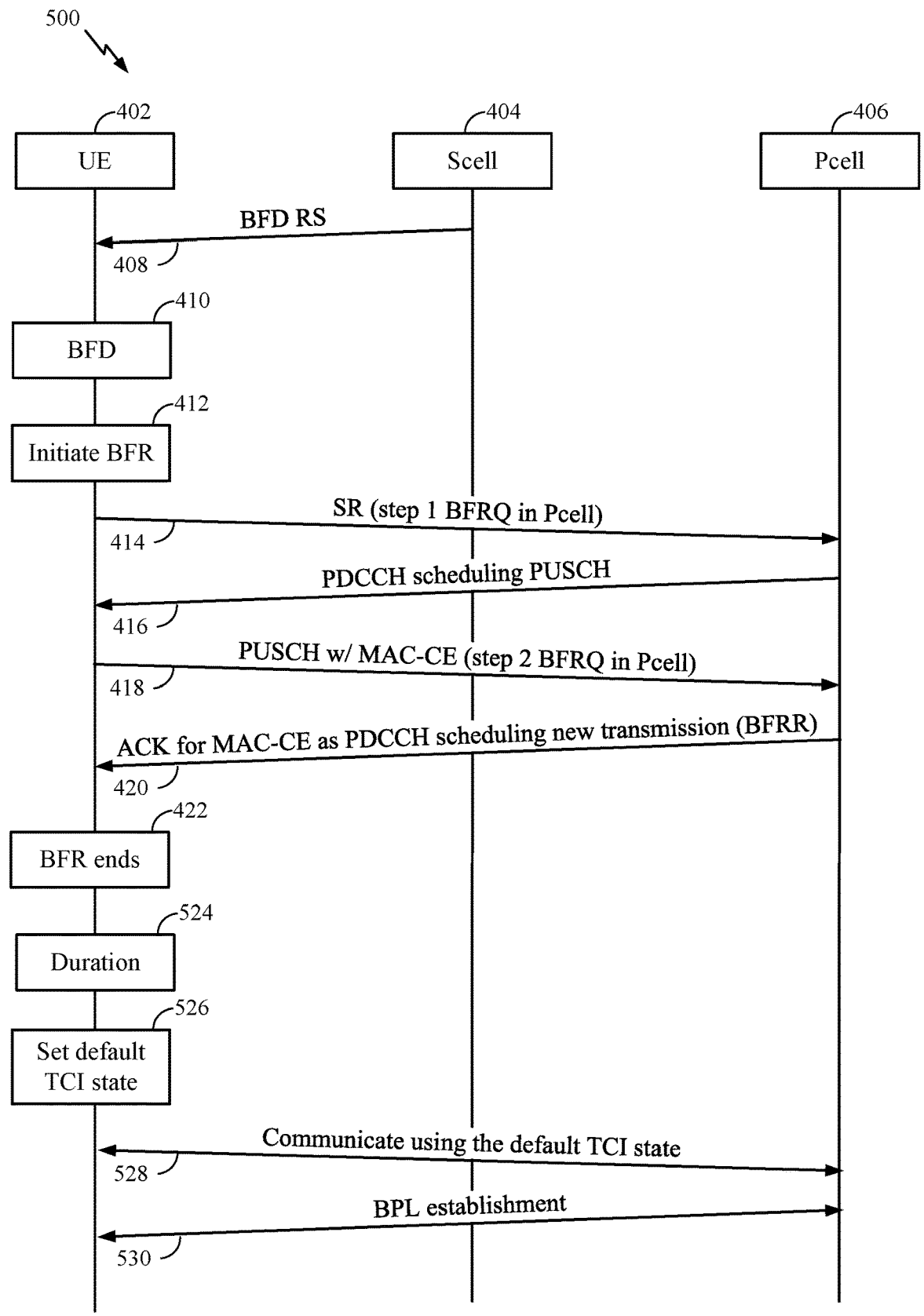
FIG. 5 is a call flow illustrating an example an example duration until applying a default recovery beam after a BFD and BFR procedure, in accordance with certain aspects of the present disclosure.

Establishing the BPL may take time. Meanwhile, in time interval between the BFRR transmission at 420, and BPL establishment at 530, a default beam can be used for communications with the failed Scell 404, at 528, as shown in FIG. 5. Use of the default beam (e.g., default TCI state beam) with the cell after the BFR procedure is completed may reduce latency while the BPL is being established. However, it may also take time to prepare the default beam for communicating. For example, the UE may take time to decode the PDCCH in the Pcell (e.g., to decode the BFRR) and time for the UE to perform beam switching in the Scell (e.g., to switch to the default beam). The PDCCH decoding and beam switching times may be based on UE capabilities. The times may also be based on the numerologies, such as tone spacing or subcarrier spacing (SCS), associated with the Scell and Pcell, as the symbol time can be different in different for different numerologies.

Thus, according to aspects of the present disclosure, there is a duration 524 after which the UE and BS begin to use (apply, assume use, expect, monitor) the default TCI state/ beam at 526. For example, the duration 524 may be a time from the receipt/transmission of the BFFR (at 420) until a time the use of the default beam begins or can begin (at 526).

According to certain aspects, the duration 524 may be a fixed duration. In some examples, the fixed duration is 28 symbols. In some examples, the fixed duration may be specified in a wireless standard (e.g., such as in an IEEE wireless standard for NR), and/or may be preconfigured or hardcoded at the UE and/or BS. In some examples, the BS can configure the UE with the fixed duration. In some examples, the fixed duration may be determined according a predefined rule. In some examples, the fixed duration may be based on a UE capability (e.g., such as the beam switching latency capability of the UE in the case of same cell scheduling).

In this case, upon transmission/reception of the BFRR, the UE and the BS can begin using (or monitoring) the default beam for communicating on the failed Scell after the fixed duration.

In some examples, the fixed duration is used to determine the duration 524 when the SCS of the cell used to transmit the BFRR (e.g., the Pcell) has the same or a larger SCS than the SCS of the failed SCell. For example, the fixed duration may be in symbols. Thus, because the Scell and Pcell may use different SCS, the length of time can be computed based on the number of symbols for the Pcell SCS and for the Scell SCS. The larger computed value may be used for the duration 524. In other words, the fixed duration may be based on the smaller SCS of the cell on which the BFRR is sent/received (e.g., the Pcell) and the failed cell (e.g., the Scell).

According to certain aspects, the duration 524 may be a computed duration. In some examples, the duration 524 is computed as a sum of two parts. For example, the duration 524 may be computed as the sum of a time for processing the BFRR (e.g., the process a PDCCH on the Pcell) and a time for beam switching on the failed cell (e.g., the Scell). The computed duration may include a fixed portion and an adjustment value.

In some examples, the fixed value may be based on the failed Scell SCS. For example, there may be a fixed number of symbols and the length of time may be computed based on the SCS of the failed Scell. In some examples, the fixed duration (or the number of symbols) may be based on a UE capability (e.g., beam switch latency in case of same cell scheduling).

In some examples, the adjustment value may account for extra PDCCH processing time due to different SCSs between the BFRR cell and the failed cell. The adjustment value may be specified in the wireless standards, preconfigured, or determined based on UE capability. The adjustment value may be specified or determined per-SCS combination of BFRR and failed cells.

In some examples, the computed duration is used to determine the duration 524 when the SCS of the cell used to transmit the BFRR (e.g., the Pcell) has a smaller SCS than the SCS of the failed SCell.

According to certain aspects, the UE can indicate the duration 524 in the BFRQ. In some examples, the duration 524 is per failed Scell and can be identified/indicated based on the MAC-CE in the BFRQ. For example, the MAC-CE reports the failed Scell ID, and the duration 418 can be determined at least by the SCS of the failed CC. In some examples, the time is explicitly indicated in the MAC-CE.

In some examples, the default beam may be used for all control resource sets (coresets) on the failed cell. For example, the default beam may be used for the PDCCH on the failed cell. According to certain aspects, the default beam may be used for the physical downlink shared channel (PDSCH), the physical uplink control channel (PUCCH), and/or the sounding reference signal (SRS) for codebook and/or non-codebook antenna switching.

In some examples, the duration 526 may include at least K symbols after receiving the BFFR message in response to the 2-step BFRQ message. In some examples, the K symbols are in units of symbol length based on the SCS of the failed Scell.

According to certain aspects, when the Pcell and the failed Scell have the same SCS, the duration 526 is fixed. For example, K=28 symbols when the Pcell and the failed Scell have the same SCS. For example, the duration 526 may be fixed when the Pcell PDCCH SCS and the Scell PDSCH SCS are the same.

According to certain aspects, when the Pcell and the failed Scell have different SCS (e.g., Pcell PDCCH SCS and Scell PDSCH SCS are different), then the duration 526 is based on the fixed value and an addition value that accounts for extra processing delay. For example, when the Pcell and the failed Scell have different SCS K=28+M symbols, where M accounts for processing delay. For example, M may account for the minimum extra PDCCH processing delay. M may be based on the different SCS of the Pcell and the failed Scell. In some examples, a different values of M is used for different SCSs. In an example, M=4, 4, 8, 12 symbols when the Pcell PDCCH SCS is 15, 30, 60, and 120 kHz, respectively, as defined for cross-carrier scheduling of PDSCH with different PDCCH and PDSCH SCS. In some examples, the value of M is the same regardless of the SCS. For example, M=14 symbols when the Pcell PDCCH SCS is 15, 30, 60, and 120 kHz.

According to certain aspects, the K number of symbols (e.g., K=28 or K=28+M symbols) may be rounded to a next slot boundary at the failed Scell. For example, if the K symbols ends in a symbol that is not at the slot boundary, the K symbols may be extended to a number of symbols until the duration 526 ends at the next slot boundary. In an illustrative example, referring to FIG. 3, if the K symbols end at any symbols 1-12 in the slot 0, then K may be rounded to include additional symbols such that the duration 526 ends at symbol 13 (slot boundary between slot 0 and slot 1). Thus, determining the duration can include adding an additional numbers of symbols to the second duration such that the determined duration until using the default beam ends at a next slot boundary.

Figure 6A:
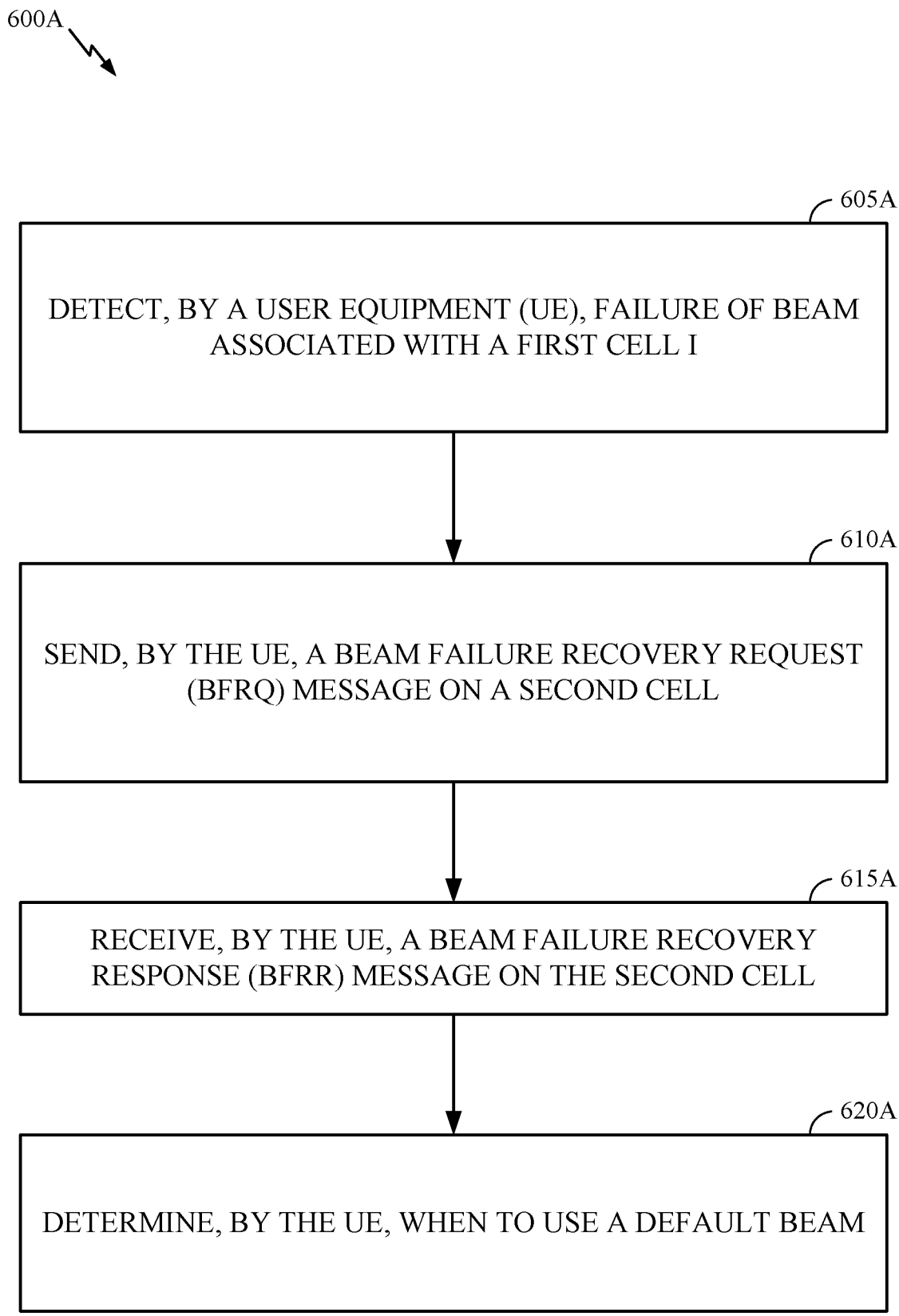
FIG. 6A is a flow diagram illustrating example operations for wireless communication by a UE, in accordance with certain aspects of the present disclosure.
Figure 6B:
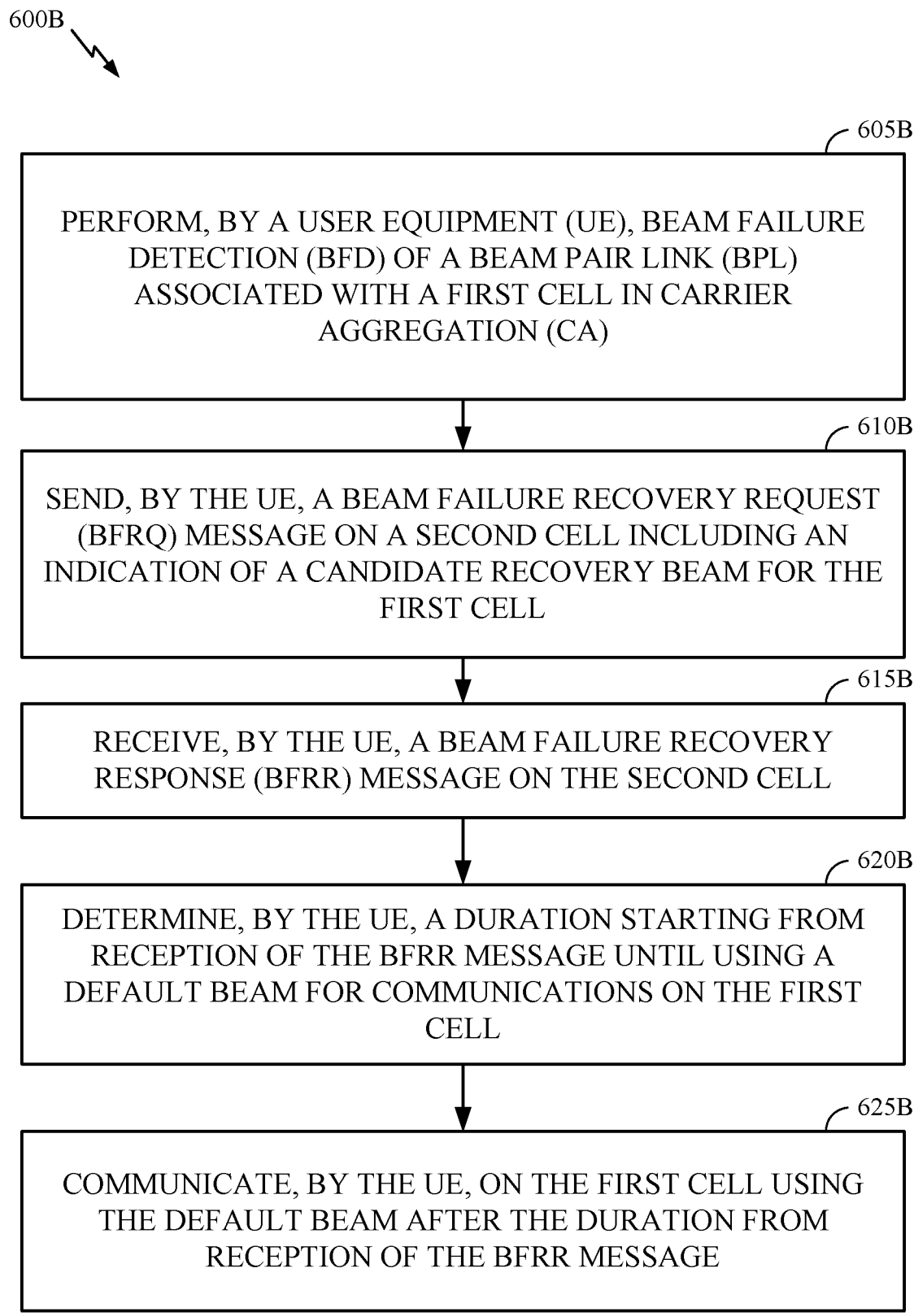
FIG. 6B is another flow diagram illustrating example operations for wireless communication by a UE, in accordance with certain aspects of the present disclosure.

FIG. 6A and FIG. 6B are flow diagrams illustrating example operations 600A and 600B, respectively, for wireless communication, in accordance with certain aspects of the present disclosure. The operations 600A and 600B may be performed, for example, by UE (e.g., such as a UE 120a in the wireless communication network 100). Operations 600A and 600B may be implemented as software components that are executed and run on one or more processors (e.g., controller/processor 280 of FIG. 2). Further, the transmission and reception of signals by the UE in operations 600A and 600B may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600A may begin, at 605A, by detecting failure of a beam associated with a first cell. For example, the operations may include performing BFD as shown in 605B. The BFD may detect failure of a BPL associated with a first cell (e.g., an Scell). The first cell may be in CA with a second cell.

At 610A, the UE sends a BFRQ message on a second cell (e.g., the Pcell). The BFRQ message can include an indication of a candidate recovery beam for the first cell (e.g., the failed Scell) as shown in 610B. In some examples, the UE measures a BFD RS from the first cell using the BPL and determines a quality of the BPL is below a threshold based on the measurement. The BFRQ message may be send in response to the measurement. In some examples, sending the BFRQ message includes sending a SR on the second cell in a PUCCH and sending a MAC-CE on the second cell in a PUSCH. The MAC-CE can include a CC index of the first cell and the indication of the candidate beam. In some examples, the UE receives PDCCH on the second cell, in response to the SR, scheduling the PUSCH.

At 615A (and at 615B), the UE receives a BFRR message on the second cell. In some examples, the BFRR message is received on the second cell in response to the BFRQ. The BFRR message can acknowledge the MAC-CE. The BFRR message can schedule a new transmission.

At 620A, the UE determines when to use a default beam. For example, the UE may determine a duration starting from reception of the BFRR message until using a default beam as shown in 620B. The default beam may be used for communications on the first cell (e.g., the failed Scell). In some examples, the default beam is the indicated candidate recovery beam for the first cell. In some examples, the default beam is indicated to the UE by the BS. The UE may communicate on the first cell using the default beam after the duration from receiving the BFRR, as shown in 625B.

According to certain aspects, the UE determines a fixed duration from receiving the BFRR message. In some examples, the fixed duration is configured by a BS, hardcoded at the UE according to a wireless standard, preconfigured, and/or determined from a predefined rule.

In some examples, the fixed duration is based on a capability of the UE. For example, the capability of the UE may be a beam switch latency. In some examples, the UE determines the fixed duration when a SCS of the failed cell is equal to or smaller than the SCS of a cell on which the BFRQ is sent. In some examples, the fixed duration is determined as the larger of a time to update to the default beam in the failed cell and a time to update to the default beam of the other cell on which the BFRQ is sent. For example, the UE can determine a fixed number of symbols, compute a first duration of the number of symbols based on the SCS of the failed, compute a second duration of the number of symbols based on the SCS of the cell on which the BFRQ is sent, and select the larger of the first and second durations as the fixed duration. The fixed number of symbols may be based on a configuration hardcoded at the UE according to a wireless standard, preconfigured, and/or indicated by the BS.

According to certain aspects, the UE determines a total duration of a fixed duration and an adjustment duration. In some examples, the fixed duration may be based, at least in part, on a SCS of the failed cell. The fixed duration may further based on a capability of the UE. For example, the capability may be beam switch latency. In some examples, the adjustment duration includes a PDCCH processing time. The PDCCH processing time may be based, at least in part, on a SCS of the failed cell and an SCS of the other cell on which the BFRR is sent. The adjustment duration may be hardcoded based on a wireless standard, preconfigured, and/or determined based on a UE capability. In some examples, the UE determines the total duration when the SCS of the failed cell is different than the SCS of the other cell which the BFRQ is sent.

According to certain aspects, the UE can indicate the determined duration in the BFRQ message.

According to certain aspects, the UE uses the default beam until a TCI state activation or reconfiguration for the failed cell is received from a BS.

Figure 7:
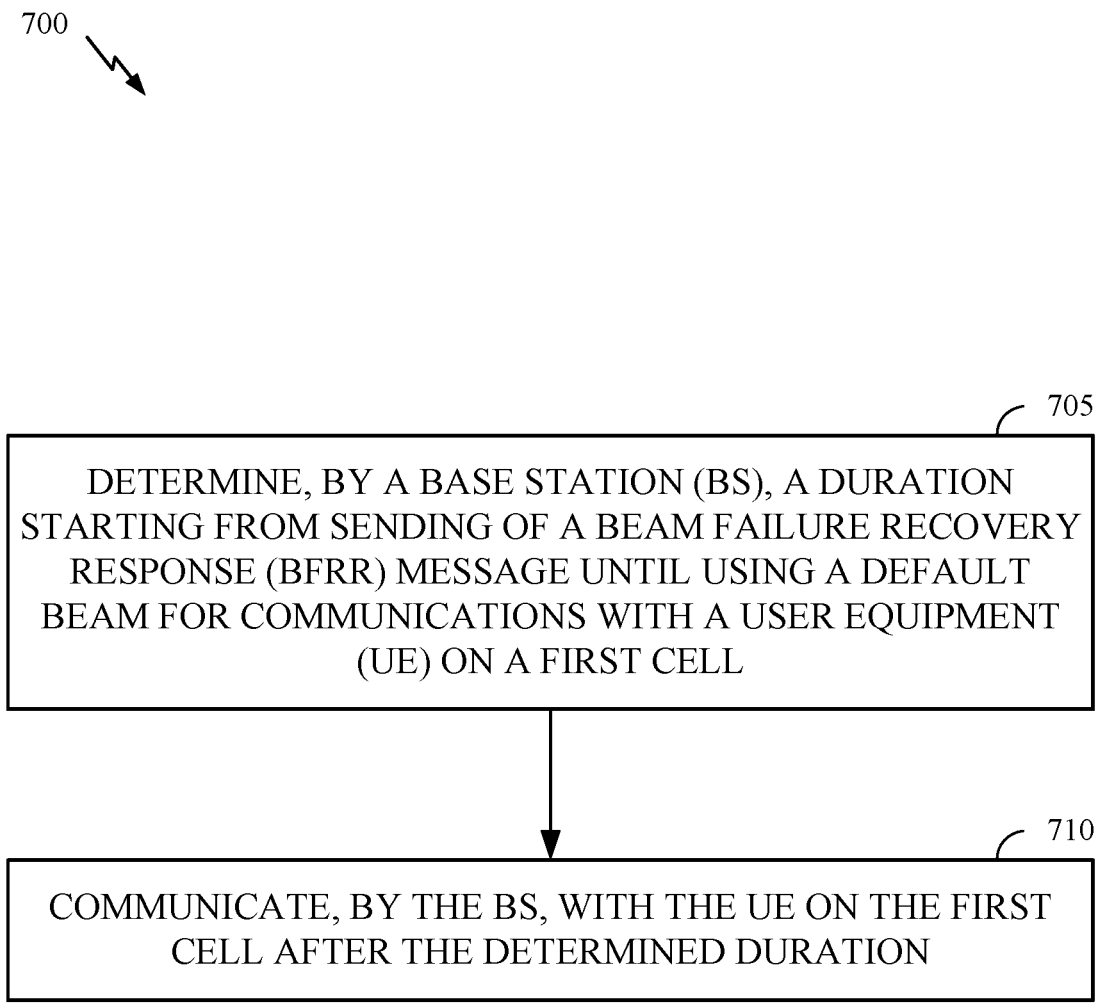
FIG. 7 is a flow diagram illustrating example operations for wireless communication by a BS, in accordance with certain aspects of the present disclosure.

FIG. 7 is a flow diagram illustrating example operations 700 for wireless communication, in accordance with certain aspects of the present disclosure. The operations 700 may be performed, for example, by a BS (e.g., such as the BS 110a in the wireless communication network 100). The operations 700 may be complimentary operations by the BS to the operations 600 performed by the UE. Operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 700 may begin, at 705, by determining a duration starting from sending of a BFRR message until using a default beam for communications with a UE on a first cell (e.g., an Scell). The default beam may be the indicated candidate recovery beam for the first cell.

In some examples, the BS sends one or more BFD RS to the UE on the first cell using a BPL between the BS and UE. In some examples, the BS receives a BFRQ message from the UE, on a second cell (e.g., a Pcell), in response to the one or more BFD-RS, the BFRQ message including an indication of a candidate recovery beam for the first cell. The BS may send the BFRR message to the UE, on the second cell, in response to the BFRQ message. In some examples, the received BFRQ message includes an SR from the UE on the second cell in a PUCC; and a MAC-CE from the UE on the second cell in a PUSCH. The MAC-CE can include a CC index of the first and the indication of the candidate beam. In some examples, the BS sends a PDCCH to the UE on the second cell, in response to the SR. The PDCCH can schedule the PUSCH. In some examples, the BFRR message is sent on the second cell in response to the BFRQ. The BFRR message may acknowledge the MAC-CE. The BFRR message may schedule a new transmission.

According to certain aspects, the BS determines a fixed duration from receiving the BFRR message. In some examples, the BS configures the UE with the fixed duration. In some examples, the fixed duration is hardcoded at the UE according to a wireless standard, preconfigured, and/or determined from a predefined rule.

In some examples, the fixed duration is based on a capability of the UE. For example, the capability of the UE may be a beam switch latency. In some examples, the BS determines the fixed duration when a SCS of the failed cell is equal to or smaller than the SCS of a cell on which the BFRQ is sent. In some examples, the fixed duration is determined as the larger of a time to update to the default beam in the failed cell and a time to update to the default beam of the other cell on which the BFRQ is sent. For example, the BS can determine a fixed number of symbols, compute a first duration of the number of symbols based on the SCS of the failed cell, compute a second duration of the number of symbols based on the SCS of the cell on which the BFRQ is sent, and select the larger of the first and second durations as the fixed duration. The fixed number of symbols may be based on a configuration hardcoded according to a wireless standard or indicated by the BS to the UE.

According to certain aspects, the BS may determine a total duration of a fixed duration and an adjustment duration. In some examples, the fixed duration may be based, at least in part, on a SCS of the first cell. The fixed duration may further based on a capability of the UE. For example, the capability may be beam switch latency. In some examples, the adjustment duration includes a PDCCH processing time. The PDCCH processing time may be based, at least in part, on a SCS of the failed cell and an SCS of the other cell on which the BFRR is sent. The adjustment duration may be hardcoded based on a wireless standard, preconfigured, and/or determined based on a UE capability. In some examples, the BS determines the total duration when the SCS of the failed cell is different than the SCS of the other cell which the BFRQ is sent.

According to certain aspects, the BS receives an indication of the duration from the UE in the BFRQ message. The duration may comprise a number of perspectives in various aspects. The duration may be a length of time in some aspects and/or some number of symbols. Time lengths may be static or dynamic and may also be pre-provisioned and/or modified during communication operations. The duration may be relative to a threshold of interest in some aspects. Such thresholds can be time-based, signal-based, or based on communication operations. Further, the duration can be related to or based on a number of beams, beam pairs, beam failures, or types of components or network nodes involved in communication operations. Further, the duration can be related to recovery attempts or recovery procedures. Still yet, the duration may comprise multiple parts and be a sum of such multiple parts (e.g., fixed value as function of Scell SCS and adjustment term to account for different SCS between Pcell and Scell)

At 710, the BS communicates with the UE on the first cell after the determined duration. The BS may use the default beam until a TCI state activation or reconfiguration for the first cell is configured at the UE.

Figure 8:
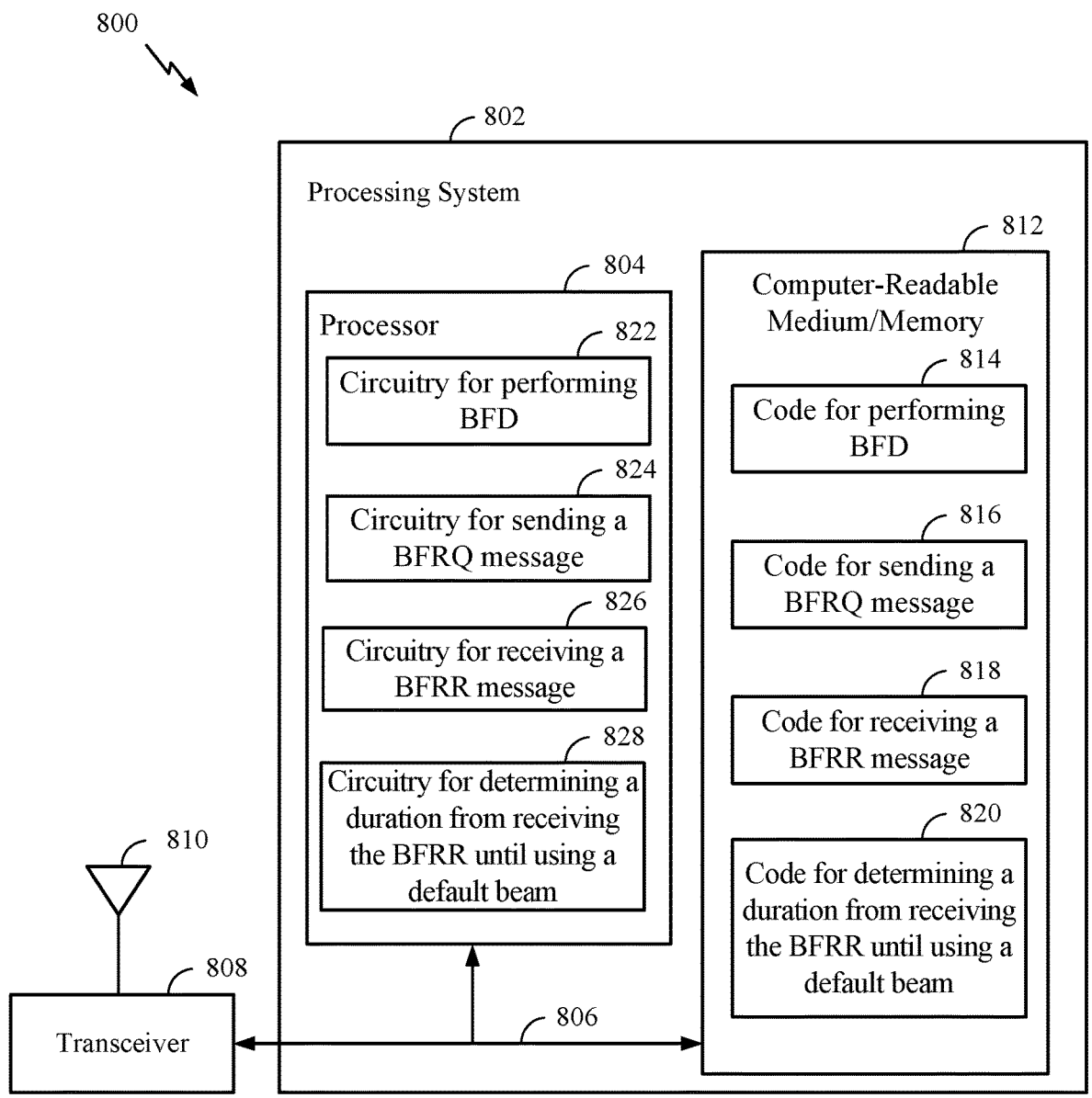
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 6. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 6, or other operations for performing the various techniques discussed herein for a duration to applying a default beam after BFFR. In certain aspects, computer-readable medium/memory 812 stores code 814 for detecting failure of a beam associated with a first cell, such as code for performing a BFD procedure; code 816 for sending a BFRQ message, code 818 for receiving a BFRR message, and code 820 for determining a duration from receiving the BFRR until using a default beam, in accordance with aspects of the present disclosure. In certain aspects, the processor 804 has circuitry configured to implement the code stored in the computer-readable medium/memory 812. The processor 804 includes circuitry 822 for detecting failure of a beam associated with a first cell, such as circuitry for performing a BFD procedure; circuitry 824 for sending a BFRQ message, circuitry 826 for receiving a BFRR message, and circuitry 828 for determining a duration from receiving the BFRR until using a default beam, in accordance with aspects of the present disclosure.

Figure 9:
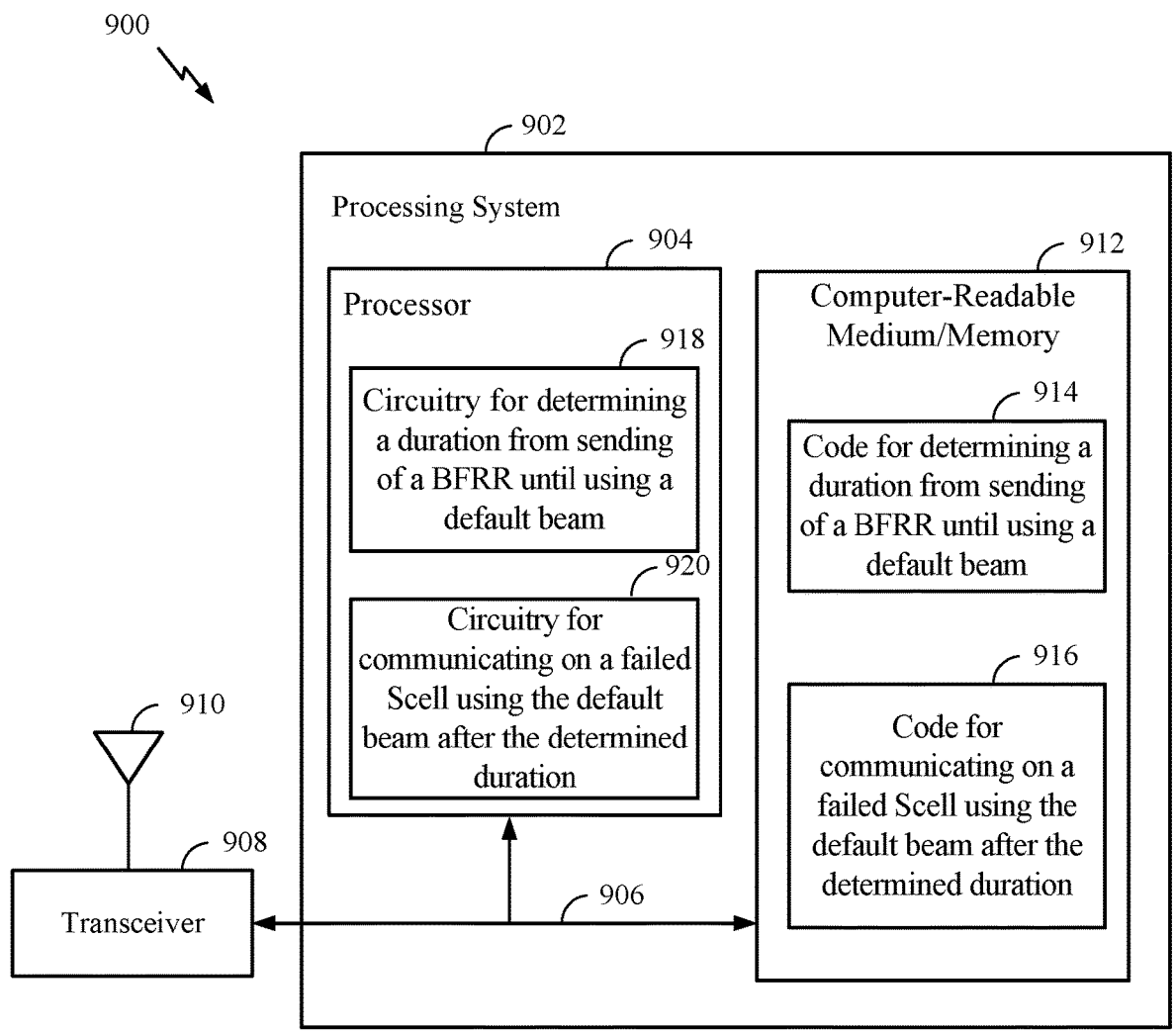
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 7, or other operations for performing the various techniques discussed herein for a duration to applying a default beam after BFFR. In certain aspects, computer-readable medium/memory 912 stores code 914 for determining a duration from sending of a BFRR until using a default beam; and code 916 for communicating on a failed first cell after the determined duration using the default beam, in accordance with aspects of the present disclosure. In certain aspects, the processor 904 has circuitry configured to implement the code stored in the computer-readable medium/memory 912. The processor 904 includes circuitry 918 for determining a duration from sending of a BFRR until using a default beam; and circuitry 920 for communicating on a failed first cell after the determined duration using the default beam, in accordance with aspects of the present disclosure.

Example Aspects

In a first aspect, a method for wireless communication by a user equipment (UE) is provided. In some examples, the method includes detecting failure of a beam associated with a first cell. For example, the method can include performing beam failure detection (BFD). The BFD can detect failure of a beam pair link (BPL) associated with the first cell. The first cell may be in carrier aggregation (CA) with a second cell. In some examples, the method include sends a beam failure recovery request (BFRQ) message. The BFRQ may be sent on a second cell. In some examples, the method includes receiving a beam failure recovery response (BFRR) message. The BFRR may be received on the second cell. In some examples, the method includes determining when to use a default beam. The determining may include determining duration starting from reception of the BFRR message until using the default beam. The default beam may be used for communications on the first cell. In some examples, the method includes communicating on the first cell using the default beam after the duration from reception of the BFRR message.

In a second aspect, in combination with the first aspect, the default beam includes the indicated candidate recovery beam for the first cell.

In a third aspect, in combination with one or more of the first and second aspects, sending the BFRQ message includes sending a scheduling request (SR) on a primary cell (Pcell) in a physical uplink control channel (PUCCH) and sending a medium access control (MAC) control element (CE) on the Pcell in a physical uplink shared channel (PUSCH). The MAC-CE includes a component carrier (CC) index of a secondary cell (Scell) and the indication of the candidate beam.

In a fourth aspect, in combination with one or more of the first through third aspects, determining the duration starting from the reception of the BFRR message until using the default beam for communications with the first cell includes determining a fixed duration from receiving the BFRR message.

In a fifth aspect, in combination with one or more of the first through fourth aspects, the fixed duration is configured by a base station (BS), preconfigured at the UE according to a wireless standard, or determined from a predefined rule.

In a sixth aspect, in combination with one or more of the first through fifth aspects, the fixed duration comprises a larger of a time to update to the default beam in the first cell and a time to update to the default beam in the second cell.

In a sixth aspect, in combination with one or more of the first through fifth aspects, the fixed duration is based on a capability of the UE.

In an eighth aspect, in combination with one or more of the first through seventh aspects, the capability of the UE comprises a beam switch latency.

In a ninth aspect, in combination with one or more of the first through eighth aspects, determining the duration includes determining the fixed duration when a subcarrier spacing (SCS) of the first cell is equal to or smaller than the SCS of the second cell.

In a tenth aspect, in combination with one or more of the first through ninth aspects, the UE determines a fixed number of symbols; computes a first duration of the fixed number of symbols based on the SCS of the first cell; computes a second duration of the fixed number of symbols based on the SCS of the second cell; and selects the larger of the first duration and the second durations as the fixed duration.

In an eleventh aspect, in combination with one or more of the first through tenth aspects, using the default beam for communications on the first cell includes using the default beam for receiving a physical downlink shared channel (PDSCH) transmission, receiving a physical downlink control channel (PDCCH) transmission, sending a physical uplink control channel (PUCCH) transmission, and/or sending a sounding reference signal (SRS).

In a twelfth aspect, in combination with one or more of the first through eleventh aspects, the UE indicates the determined duration in the BFRQ message.

In a thirteenth aspect, a method for wireless communication by a base station (BS) is provided. In some examples, the method includes determining when to use a default beam. For example, the determination can include determining a duration starting from sending of a beam failure recovery response (BFRR) message until using the default beam. The default beam can be for communications with a user equipment (UE) on a first cell. In some examples, the method can include communicating with the UE on the first cell, using the default beam, after the determined duration.

In a fourteenth aspect, in combination with the thirteenth aspect, the BS receives a beam failure recovery request (BFRQ) message from the UE, on a second cell. The BFRQ message includes an indication of a candidate recovery beam for the first cell. The BS sends the BFRR message to the UE, on the second cell, in response to the BFRQ message. The default beam comprises the candidate recovery beam for the first cell.

In a fifteenth aspect, in combination with one or more of the thirteenth and fourteenth aspects, receiving the BFRQ message includes receiving a scheduling request (SR) from the UE on a primary cell (Pcell) in a physical uplink control channel (PUCCH) and receiving a medium access control (MAC) control element (CE) from the UE on the Pcell in a physical uplink shared channel (PUSCH). The MAC-CE includes a component carrier (CC) index of a secondary cell (Scell) and the indication of the candidate beam. The BS sends a physical downlink control channel (PDCCH) to the UE on the Pcell, in response to the SR, the PDCCH scheduling the PUSCH. The BFRR message from the BS is sent on the Pcell in response to the BFRQ, acknowledges the MAC-CE, and schedules a new transmission.

In a sixteenth aspect, in combination with one or more of the thirteenth through fifteenth aspects, determining the duration starting from the sending of the BFRR message until using the default beam for communications with the UE on the first cell includes determining a fixed duration from sending of the BFRR message.

In a seventeenth aspect, in combination with one or more of the thirteenth through sixteenth aspects the BS configures the UE with the fixed duration, the fixed duration is preconfigured according to a wireless standard, or the fixed duration is determined from a predefined rule.

In an eighteenth aspect, in combination with one or more of the thirteenth through seventeenth aspects the fixed duration is a larger of a time to update to the default beam in the first cell and a time to update to the default beam in the second cell.

In a nineteenth aspect, in combination with one or more of the thirteenth through eighteenth aspects, the BS determines a number of symbols; computes a first duration of the number of symbols based on the SCS of the first cell; computes a second duration of the number of symbols based on the SCS of the second cell; and selects the larger of the first and second durations as the fixed duration.

In a twentieth aspect, in combination with one or more of the thirteenth through nineteenth aspects, the BS receives an indication of the determined duration in the BFRQ message from the UE.

In a twenty-first aspect, in combination with one or more of the thirteenth through twentieth aspects, using the default beam for communications on the first cell includes using the default beam for sending a physical downlink shared channel (PDSCH) transmission, sending a physical downlink control channel (PDCCH) transmission, receiving a physical uplink control channel (PUCCH) transmission, and/or receiving a sounding reference signal (SRS).

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6 and/or FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
    detecting failure of a beam associated with a first cell;
    sending a beam failure recovery request (BFRQ) message on a second cell;
    receiving a beam failure recovery response (BFRR) message on the second cell; and
    determining a fixed duration starting from reception of the BFRR message until using a default beam for communications on the first cell, wherein the fixed duration comprises a larger of a first duration of a fixed number of symbols based on a first subcarrier spacing (SCS) of the first cell and a second duration of the fixed number of symbols based on a second SCS of the second cell.

2. The method of claim 1, wherein detecting the failure of the beam comprises performing beam failure detection (BFD) of a beam pair link (BPL) associated with the first cell.

3. The method of claim 1, further comprising communicating on the first cell using the default beam after the fixed duration from the reception of the BFRR message.

4. The method of claim 1, wherein the default beam comprises a candidate recovery beam for the first cell indicated in the BFRQ message.

5. The method of claim 1, wherein sending the BFRQ message comprises:
    sending a scheduling request (SR) on a primary cell (Pcell) in a physical uplink control channel (PUCCH); and
    sending a medium access control (MAC) control element (CE) on the Pcell in a physical uplink shared channel (PUSCH), the MAC-CE including a component carrier (CC) index of a secondary cell (Scell) and an indication of a candidate recovery beam.

6. The method of claim 1, wherein the fixed duration is configured by a base station (BS), preconfigured at the UE according to a wireless standard, or determined from a predefined rule.

7. The method of claim 1, wherein the fixed duration comprises a larger of a time to update to the default beam in the first cell and a time to update to the default beam in the second cell.

8. The method of claim 1, wherein the fixed duration is based on a capability of the UE.

9. The method of claim 8, wherein the capability of the UE comprises a beam switch latency.

10. The method of claim 1, wherein determining the fixed duration comprises determining the fixed duration when the first SCS of the first cell is equal to or smaller than the second SCS of the second cell.

11. The method of claim 1, further comprising using the default beam for at least one of: receiving a physical downlink shared channel (PDSCH) transmission, receiving a physical downlink control channel (PDCCH) transmission, sending a physical uplink control channel (PUCCH) transmission, or sending a sounding reference signal (SRS).

12. The method of claim 1, further comprising indicating the determined fixed duration in the BFRQ message.

13. A method for wireless communication by a base station (BS), comprising:

determining a fixed duration starting from sending of a beam failure recovery response (BFRR) message until using a default beam for communications with a user equipment (UE) on a first cell, wherein the fixed duration comprises a larger of a first duration of a fixed number of symbols based on a first subcarrier spacing (SCS) of the first cell and a second duration of the fixed number of symbols based on a second SCS of a second cell; and communicating with the UE on the first cell, using the default beam, after the determined fixed duration.

14. The method of claim 13, further comprising:

receiving a beam failure recovery request (BFRQ) message from the UE, on the second cell, the BFRQ message including an indication of a candidate recovery beam for the first cell; and sending the BFRR message to the UE, on the second cell, in response to the BFRQ message, wherein the default beam comprises the candidate recovery beam for the first cell.

15. The method of claim 14, wherein:

receiving the BFRQ message comprises:

receiving a scheduling request (SR) from the UE on a primary cell (Pcell) in a physical uplink control channel (PUCCH); and receiving a medium access control (MAC) control element (CE) from the UE on the Pcell in a physical uplink shared channel (PUSCH), the MAC-CE including a component carrier (CC) index of a secondary cell (Scell) and the indication of the recovery candidate beam; and the method further comprises:

sending a physical downlink control channel (PDCCH) to the UE on the Pcell, in response to the SR, the PDCCH scheduling the PUSCH, wherein the BFRR message from the BS is sent on the Pcell in response to the BFRQ, acknowledges the MAC-CE, and schedules a new transmission.

16. The method of claim 13, wherein the BS configures the UE with the fixed duration, the fixed duration is preconfigured according to a wireless standard, or the fixed duration is determined from a predefined rule.

17. The method of claim 13, wherein the fixed duration comprises a larger of a time to update to the default beam in the first cell and a time to update to the default beam in the second cell.

18. The method of claim 13, further comprising receiving an indication of the determined fixed duration in the BFRQ message from the UE.

19. The method of claim 13, wherein communicating with the UE on the first cell, using the default beam, after the determined fixed duration comprises using the default beam for at least one of: sending a physical downlink shared channel (PDSCH) transmission, sending a physical downlink control channel (PDCCH) transmission, receiving a physical uplink control channel (PUCCH) transmission, or receiving a sounding reference signal (SRS).

20. An apparatus for wireless communication, comprising:

at least one processor coupled with a memory, the memory comprising code executable by the at least one processor to cause the apparatus to:

detect failure of a beam associated with a first cell;

send a beam failure recovery request (BFRQ) message on a second cell;

receive a beam failure recovery response (BFRR) message on the second cell; and determine a fixed duration starting from reception of the BFRR message until using a default beam for communications on the first cell, wherein the fixed duration comprises a larger of a first duration of a fixed number of symbols based on a first subcarrier spacing (SCS) of the first cell and a second duration of the fixed number of symbols based on a second SCS of the second cell.

21. The apparatus of claim 20, further comprising code executable by the at least one processor to cause the apparatus to use the default beam for at least one of: receiving a physical downlink shared channel (PDSCH) transmission, receiving a physical downlink control channel (PDCCH) transmission, sending a physical uplink control channel (PUCCH) transmission, or sending a sounding reference signal (SRS).

22. An apparatus for wireless communication, comprising:

at least one processor coupled with a memory, the memory comprising code executable by the at least one processor to cause the apparatus to:

determine a fixed duration starting from sending of a beam failure recovery response (BFRR) message until using a default beam for communications with a user equipment (UE) on a first cell, wherein the fixed duration comprises a larger of a first duration of a fixed number of symbols based on a first subcarrier spacing (SCS) of the first cell and a second duration of the fixed number of symbols based on a second SCS of a second cell; and communicate with the UE on the first cell, using the default beam, after the determined fixed duration.

23. The apparatus of claim 22, wherein the code is further executable by the at least one processor to cause the apparatus to:

receive a beam failure recovery request (BFRQ) message from the UE, on a second cell, the BFRQ message including an indication of a candidate recovery beam for the first cell; and send the BFRR message to the UE, on the second cell, in response to the BFRQ message, wherein the default beam comprises the candidate recovery beam for the first cell.

* * * * *